United States Patent
Coviello et al.

(10) Patent No.: US 12,112,215 B2
(45) Date of Patent: Oct. 8, 2024

(54) DATA EXCHANGE AND TRANSFORMATION IN STREAM COMPUTING SYSTEMS

(71) Applicant: NEC Laboratories America, Inc., Princeton, NJ (US)

(72) Inventors: Giuseppe Coviello, Robbinsville, NJ (US); Kunal Rao, Monroe, NJ (US); Murugan Sankaradas, Dayton, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 80 days.

(21) Appl. No.: 17/885,115

(22) Filed: Aug. 10, 2022

(65) Prior Publication Data

US 2023/0048581 A1    Feb. 16, 2023

Related U.S. Application Data

(60) Provisional application No. 63/232,562, filed on Aug. 12, 2021.

(51) Int. Cl.
*G06F 9/54* (2006.01)
(52) U.S. Cl.
CPC .................................. *G06F 9/543* (2013.01)
(58) Field of Classification Search
None
See application file for complete search history.

(56) References Cited

U.S. PATENT DOCUMENTS

| | | | | |
|---|---|---|---|---|
| 2019/0065323 | A1* | 2/2019 | Dhamdhere | G06F 11/1484 |
| 2020/0364953 | A1* | 11/2020 | Simoudis | G06N 20/00 |
| 2021/0240540 | A1* | 8/2021 | Wang | G06F 9/45558 |
| 2022/0156631 | A1* | 5/2022 | Kanso | G06F 8/60 |
| 2022/0188149 | A1* | 6/2022 | Chiu | G06F 9/4881 |
| 2022/0283792 | A1* | 9/2022 | Kumar | H04L 41/0895 |

OTHER PUBLICATIONS

Bakshi "Microservices-Based Software Architecture and Approaches", In 2017 IEEE aerospace conference Mar. 4, 2017 (pp. 1-8).

Burns et al., "Kubernetes: up and running: dive into the future of infrastructure", O'Reilly Media, Jul. 5, 2019, pp. 1-277.

Dobies et al., "Kubernetes Operators: Automating the Container Orchestration Platform. " O'Reilly Media, Inc., Jan. 13, 2020, pp. 1-155.

Sánchez-Gallegos et al., "An efficient pattern-based approach for workflow supporting large-scale science: The DagOnStar experience", Future Generation Computer Systems, Sep. 1, 2021, pp. 187-203.

(Continued)

*Primary Examiner* — Umut Onat
(74) *Attorney, Agent, or Firm* — Joseph Kolodka

(57) ABSTRACT

Methods and systems for executing an application include extending a container orchestration system application programming interface (API) to handle objects that specify components of an application. An application representation is executed using the extended container orchestration system API, including the instantiation of one or more services that define a data stream path from a sensor to a device.

17 Claims, 8 Drawing Sheets

(56) References Cited

OTHER PUBLICATIONS

Fortino et al., "Internet of Things Based on Smart Objects", Internet of Things, Springer, 2014, https://doi.org/10.1007/978-3-319-00491-4, pp. 1-203.
Gravina et al., "Multi-sensor fusion in body sensor networks: State-of-the-art and research challenges", Information Fusion, May 1, 2017, pp. 68-80.
Lerm et al., "InfoSphere DataStage Parallel Framework Standard Practices", IBM Redbooks; Feb. 12, 2013., pp. 1-458.
Informatica, "Informatica Data Engineering Streaming", https://www.informatica.com/content/dam/informatica-com/en-collateral/data-sheet/informatica-big-data-streaming data-sheet 3236en.pdf, 2019, pp. 1-6.
Quevedo, "Practical NATS", Springer, 2018, pp. 1-271.
NeoFace Thermal Express, https://www.necam.com/Docs/?id=03e458ce-1f-46fd-a839-a3a91eb51306, Retrieved on Nov. 7, 2022, 2pgs.
Apache Airflow, https://airflow.apache.org/, Retrieved on Nov. 7, 2022, 3 pgs.
Amazon: Amazon kinesis data analytics, https://aws.amazon.com/kinesis/data-analytics/, Retrieved on Nov. 7, 2022, 5 pgs.
Amazon: Aws lambda, https://aws.amazon.com/lambda/, Retrieved on Nov. 7, 2022, 6 pgs.
Amazon: Serverless reference architecture: Real-time stream processing, https://github.com/aws-samples/lambda-refarch-streamprocessing, Retrieved on Nov. 7, 2022, 3 pgs.
James Beswick, "Using aws lambda as a consumer for amazon kinesis" https://aws.amazon.com/blogs/compute/using-aws-lambda-as-a-consumer-for-amazon-kinesis/, Sep. 30, 2020, Retrieved on Nov. 7, 2022, 3 pgs.
Databricks: Spark streaming, https://databricks.com/glossary/what-is-spark-streaming, Retrieved on Nov. 7, 2022, 3 pgs.
Datastreams.io: Data stream manager, https://datastreams.io/wp-content/uploads/2018/12/User Manual Data Stream Manager.pdf, Retrieved on Nov. 7, 2022, 11 pgs.
Dragoni et al., "Microservices: yesterday, today, and tomorrow", arXiv:1606.04036v4 [cs.SE] Apr. 20, 2017, pp. 1-17.
EsperTech: Esper, https://www.espertech.com/esper/, Retrieved on Nov. 7, 2022, 9 pgs.
Apache Flink, Stateful Computations over Data Streams, https://flink.apache.org/, Retrieved on Nov. 7, 2022, 2 pgs.
Lewis et al., "Microservices", https://martinfowler.com/articles/microservices.html, Mar. 25, 2014, pp. 1-17.
Google: Google cloud Dataflow, https://cloud.google.com/dataflow, Retrieved Nov. 7, 2022, 13 pgs.
Hazelcast: The Ultra-Fast Stream and Batch Processing Framework, Hazelcast jet, https://hazelcast.com/products/stream-processing/, Retrieved on Nov. 7, 2022, 7 pgs.
Apache Heron: A realtime, distributed, fault-tolerant stream processing engine: Apache Heron, https://heron.apache.org/, Retrieved on Nov. 7, 2022, 2 pgs.
Hitachi: Hitachi streaming data platform, https://download.hitachivantara.com/download/epcra/hsdp0034.pdf, Retrieved on Nov. 7, 2022, 134 pgs.
IBM: Real-time analytics with IBM Streams, https://www.IBM.com/downloads/cas/NAX7DDYQ, Retrieved on Nov. 7, 2022, 8 pgs.
KsqIDB: The database purpose-built for stream processing applications, ksqIDB, https://ksqldb.io/, Retrieved on Nov. 7, 2022, 6 pgs.
Microsoft: Azure stream analytics, https://azure.microsoft.com/en-us/services/stream-analytics/, Retrieved on Nov. 7, 2022, 13 pgs.
Oracle: Oracle stream analytics, https://www.oracle.com/middleware/technologies/stream-processing.html, Retrieved on Nov. 7, 2022, 3 pgs.
Steve Ranger, "What is the IoT? Everything you need to know about the Internet of Things right now", https://www.zdnet.com/article/what-is-the-internet-of-things-everything-you-need-to-know-about-the-iot-right-now/, Feb. 3, 2020, Retrieved on Nov. 7, 2022, 13 pgs.
SAS: SAS event stream processing, https://www.sas.com/en us/software/event-stream-processing.html, Retrieved on Nov. 7, 2022, 5 pgs.
Spring: Spring cloud dataflow, https://spring.io/projects/spring-cloud-dataflow, Retrieved on Nov. 7, 2022, 1 pg.
Apache Storm.: Apache storm, https://storm.apache.org/, Retrieved on Nov. 7, 2022, 2 pgs.
StreamSets: Streamsets data collector, https://streamsets.com/products/dataops-platform/data-collector/, Retrieved on Nov. 7, 2022, 7 pgs.
Striim: Data to Decisions in Real Time: Striim platform, https://www.striim.com/, Retrieved on Nov. 7, 2022, 4 pgs.
Asa Tamsons, "How 5G and the Internet of Things can create a winning business", https://www.ericsson.com/en/blog/2020/1/how-5g-and-the-internet-of-things-can-create-a-winning-business, Jan. 2020, Retrieved on Nov. 7, 2022, 4 pgs.
Tibco: Tibco streaming, https://community.tibco.com/products/tibco-streaming, Retrieved on Nov. 7, 2022, 3 pgs.
Ververica: Ververica platform, https://www.ververica.com/platform, Retrieved on Nov. 7, 2022, 4 pgs.
WSO2: Choreo by wso2, https://wso2.com/, Retrieved on Nov. 7, 2022, 2 pgs.
Cloudera: Cloudera dataflow, https://www.cloudera.com/products/cdf.html, Retrieved on Nov. 7, 2022, 8 pgs.

* cited by examiner

DATA EXCHANGE AND TRANSFORMATION IN STREAM COMPUTING SYSTEMS

RELATED APPLICATION INFORMATION

This application claims priority to U.S. Patent Application No. 63/232,562, filed on Aug. 12, 2021, incorporated herein by reference in its entirety.

BACKGROUND

Technical Field

The present invention relates to data management in distributed computing systems, and, more particularly, to developing complex services using data streams.

Description of the Related Art

Smart sensors collect information from a variety of sources, and the exponential growth in the number of such sensors has caused a similar growth in the number of data streams that need to be managed.

SUMMARY

A method for executing an application includes extending a container orchestration system application programming interface (API) to handle objects that specify components of an application. An application representation is executed using the extended container orchestration system API, including the instantiation of one or more services that define a data stream path from a sensor to a device.

A system for executing an application includes a hardware processor and a memory that stores a computer program. When executed by the hardware processor, the computer program causes the hardware processor to extend a container orchestration system application programming interface (API) to handle objects that specify components of an application and to execute an application representation using the extended container orchestration system API, including the instantiation of one or more services that define a data stream path from a sensor to a device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Building multi-sensor distributed applications is a complex programming task. Application developers may express the functionality of an application as a collection of interacting microservices that form a processing pipeline. The developers design and specify appropriate data communication systems between the distributed microservices, which has a significant impact on the performance of the application. The underlying hardware that runs the microservices plays a role as well, and databases may need to be managed to maintain the state of any microservices that need it.

Scaling multi-sensor stream processing applications, while ensuring reliable operation in the face of software and hardware failures, is particularly challenging as the number of data streams increases. Barriers to developer productivity may be reduced by providing a layer of abstraction that enables easy exchange, transformation, and management of data streams in complex, multi-sensor distributed stream processing applications. Applications may be designed by defining and registering abstract objects, such as drivers, sensors, streams, analytics units, actuators, and devices, which together can be used to specify the overall application pipeline.

During runtime, appropriate data communication mechanisms among the application's objects may be automatically determined, for example including network connections and serialization and deserialization of data streams. Developers need only provide logic for different types of analytics processing and the system will automatically handle application-specific allocation, scheduling, and execution on the underlying distributed computing resources, as well as providing auto-scaling and operational reliability.

Figure 1:
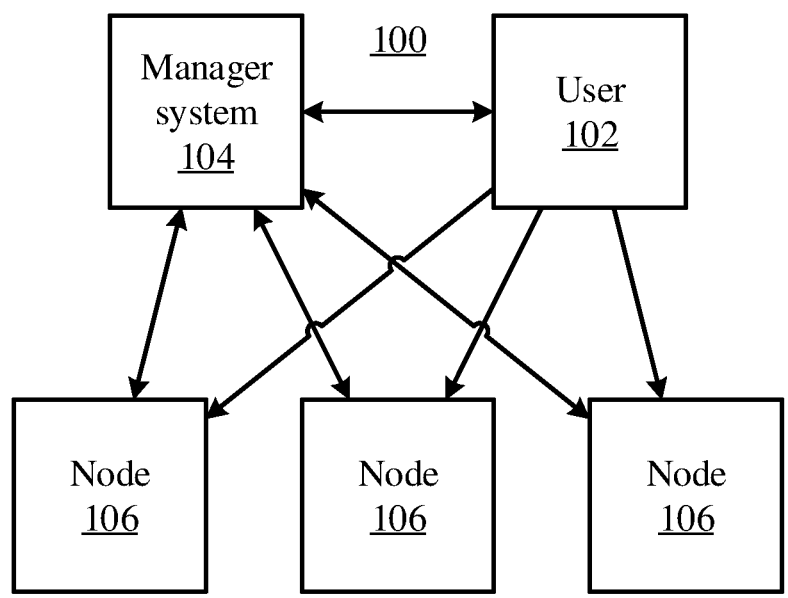
FIG. 1 is a block diagram of a distributed computing system, in accordance with an embodiment of the present invention.

Referring now to FIG. 1, a diagram of a distributed computing system 100 is shown. A user 102 may execute a workload on the distribution computing system 100. To this end, the user 102 communicates with manager system 104. The user 102 supplies information regarding the workload, including the number and type of processing nodes 106 that will be needed to execute the workload.

The information provided to the manager system 104 includes, for example, a number of processing nodes 106, a processor type, an operating system, an execution environment, storage capacity, random access memory capacity, network bandwidth, and any other points that may be needed for the workload. The user 102 can furthermore provide images or containers to the manager system 104 for storage in a registry there.

The distributed computing system 100 may include many thousands of processing nodes 106, each of which can be idle or busy in accordance with the workloads being executed by the distributed computing system 100 at any given time. Although a single manager system 104 is shown, there may be multiple such manager systems 104, with multiple registries distributed across the distributed computing system 100.

Before and during execution of the workload, the manager system 104 determines which processing nodes 106 will implement the microservices that make up the corresponding application. The manager system 104 may configure the processing nodes 106, for example based on node and resource availability at the time of provisioning. The microservices may be hosted entirely on separate processing nodes 106, or any number of microservices may be collocated at a same processing node 106. The manager system 104 and the distributed computing system 100 can handle multiple different workloads from multiple different users 102, such that the availability of particular resources will depend on what is happening in the distributed computing system 100 generally.

Provisioning, as the term is used herein, refers to the process by which resources in a distributed computing system 100 are allocated to a user 102 and are prepared for execution. Thus, provisioning includes the determinations made by the manager system 104 as to which processing elements 106 will be used for the workload as well as the transmission of images and any configuration steps that are needed to prepare the processing nodes 106 for execution of the workload. The configuration may include, for example, identifying communications methods to be used by the microservices.

Figure 2:
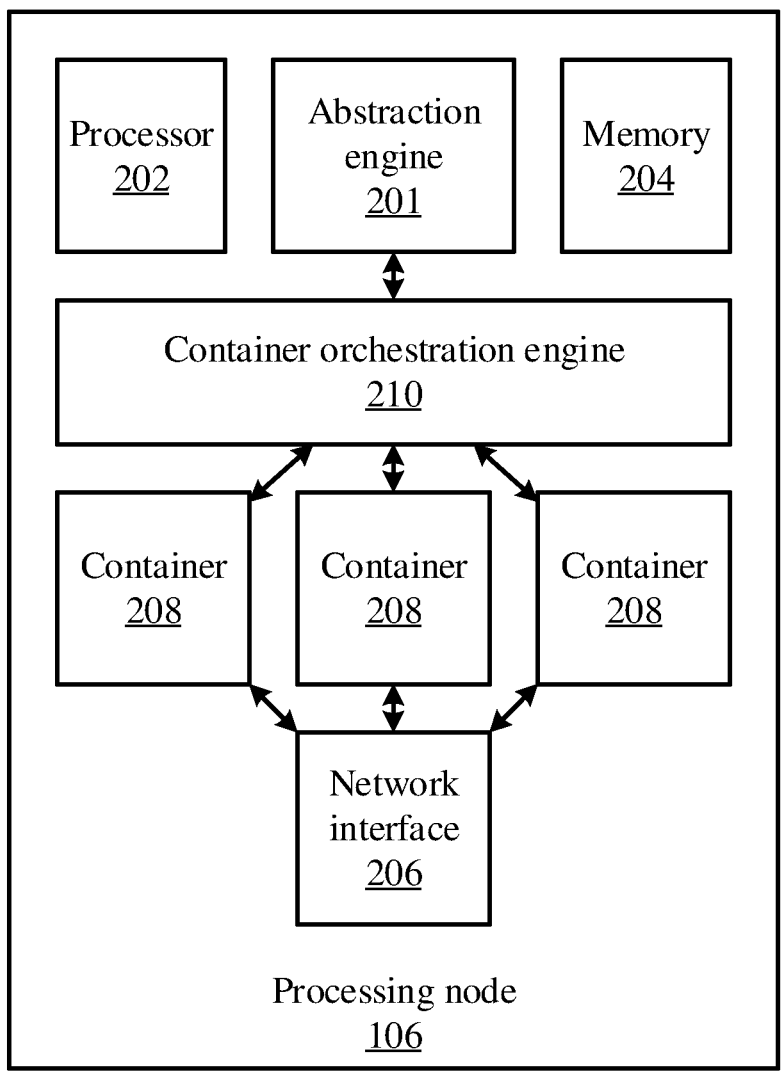
FIG. 2 is a block diagram of a processing node in a distributed computing system, in accordance with an embodiment of the present invention.

Referring now to FIG. 2, additional detail on a processing node 106 is shown. The processing node 106 includes a hardware processor 202, a memory 204, and a network interface 206. The network interface 206 may be configured to communicate with the manager system 104, with the user 102, and with other processing nodes 106 as needed, using any appropriate communications medium and protocol. The processing node 106 also includes one or more functional modules that may, in some embodiments, be implemented as software that is stored in the memory 204 and that may be executed by the hardware processor 202. In other embodiments, one or more of the functional modules may be implemented as one or more discrete hardware components in the form of, e.g., application-specific integrated chips or field programmable gate arrays.

The processing node 106 may include one or more containers 208. It is specifically contemplated that each container 208 represents a distinct operating environment. The containers 208 each include a set of software applications, configuration files, workload datasets, and any other information or software needed to execute a specific workload. These containers 208 may implement one or more microservices for a distributed application.

The containers 208 are stored in memory 204 and are instantiated and decommissioned by the container orchestration engine 210 as needed. It should be understood that, as a general matter, an operating system of the processing node 106 exists outside the containers 208. Thus, each container 208 interfaces with the same operating system kernel, reducing the overhead needed to execute multiple containers simultaneously. The containers 208 meanwhile may have no communication with one another outside of the determined methods of communication, reducing security concerns.

An abstraction engine 201 coordinates with the container orchestration engine 210 to handle configuration of the container(s) 208, for example providing configurations for communications mechanisms and the various objects of the distributed system in accordance with an application specification.

In some examples, the container orchestration engine 210 may be implemented as a KUBERNETES® system. The abstraction engine 210 may be implemented as operators within KUBERNETES® that define custom resources that the KUBERNETES® system can handle directly, so that a definition of the distributed application can call the extended API of the abstraction engine 201 to instantiate components of the representation.

Figure 3A:
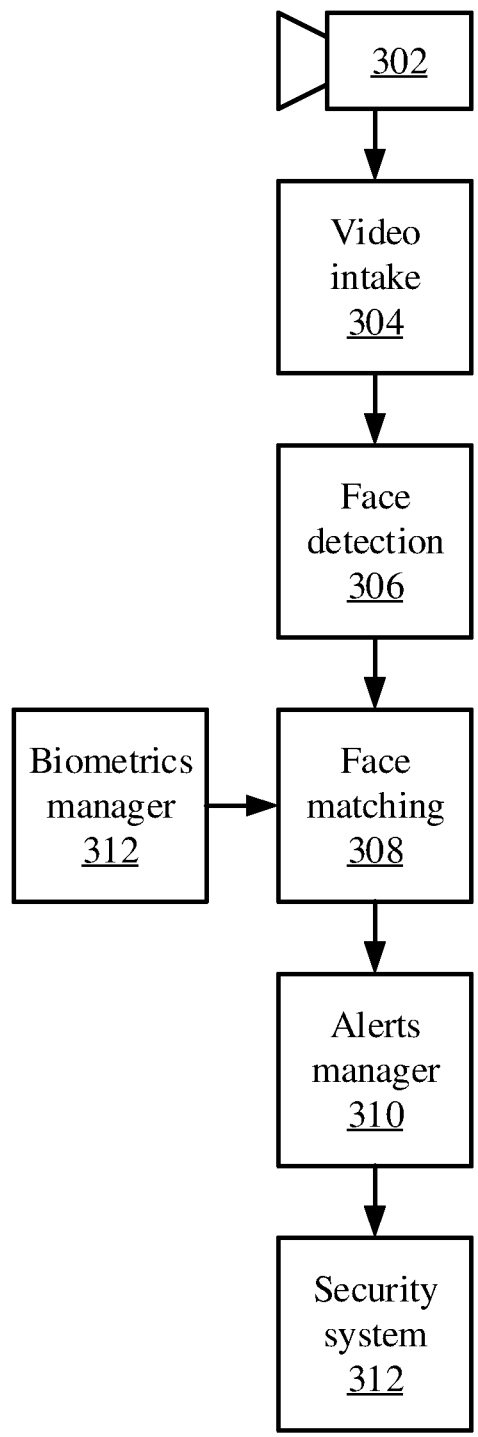
FIG. 3A is a block diagram of a distributed computing application, in accordance with an embodiment of the present invention.

Referring now to FIG. 3A, an exemplary distributed application is shown, including a set of interconnected microservices. In this example, a video analytics application can perform real-time monitoring of a video stream, which may include monitoring a given area to determine whether specific individuals have entered the area. The video analytics application can generate an alert or automated response to the detection of such an individual.

The application may include exemplary microservices such as video intake 304, face detection 306, face matching 308, alerts manager 310, and biometrics manager 312. A camera 302 generates visual data, such as a stream of images making up a video stream. Video intake 304 processes this visual data and performs any appropriate filtering or formatting to generate frames that may be considered by downstream microservices.

Face detection 306 identifies faces within the frames of the video stream. This identification may include labeling the frame to indicate the presence of a face within the image and may further include coordinates for a bounding box of the face within the image. Face matching 308 may then connect the face image with information about a person shown in the image. This matching may draw on information from biometrics manager 312, which may store profiles of people of interest. The profile may include biometric information, such as facial features that may be used to match with face images, as well as identifying information such as the person's name and role.

In the case of a security system, a person's role may include information regarding access authorization. For example, a person may be authorized to access a restricted area, or may be specifically forbidden from entering a restricted area. The alerts manager 310 may generate an alert responsive to the detection of a person by face matching 308. For example, an alert may indicate that an authorized person is present in the area, that a forbidden person is in the area, or that an unknown person is in the area.

A security system 312 may automatically respond to the alerts. The response may include a security response, such as automatically locking or unlocking a door or other access point, sounding a visual and/or audible alarm, summoning security personnel, and requesting further authentication from the detected person.

In a distributed computing system, multiple video streams can be processed at once. For example, multiple cameras 302 may generate respective video streams, and there may be respective microservices instances of video intake 304, face detection 306, and face matching 308.

The various microservices may be implemented as containers 208 within a processing node 106. In some cases, multiple microservices may be implemented on a single processing node 106, for example using different respective containers 208 or by implementing multiple microservices within a single container 208. In some cases, the microservices may be implemented using multiple different processing nodes 106, with communications between the containers 208 of the different processing nodes 106 being handled over an appropriate network.

Figure 3B:
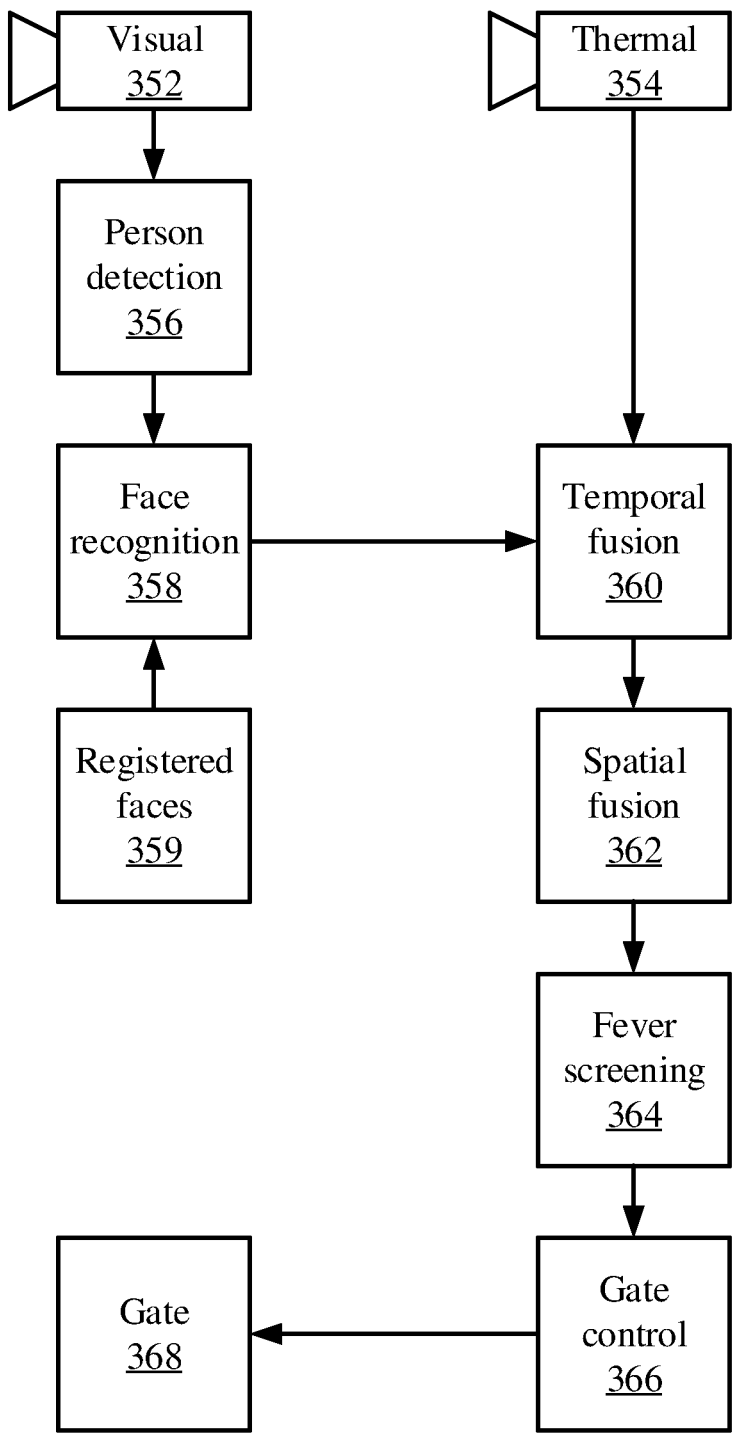
FIG. 3B is a block diagram of a distributed computing application, in accordance with an embodiment of the present invention.

Referring now to FIG. 3B, an exemplary distributed application is shown, including a set of interconnected microservices. In this application, multiple types of data are fused to control physical access through a gate 368. For example, a first camera 352 operates in the visual range of the electromagnetic spectrum, taking pictures of an environment. A second camera 354 operates in the infrared range of the electromagnetic spectrum, generating thermal images of the same environment.

The visual information is first processed to perform person detection 356 and face recognition 358. The person detection 356 takes frames of the video and identifies the locations of people within each frame, while face recognition 358 locates faces within each frame and compares them to stored faces in a database of registered faces 359.

This information is fused with thermal imaging information from the thermal camera 354 at temporal fusion 360, where images taken from the visual camera 352 and from the thermal camera 354 at roughly the same time are correlated with one another. Spatial fusion 362 identifies regions of the thermal images that correspond to regions where a person is detected in the visual images. Spatial fusion 362 accounts for the possibility that the two cameras may not be collocated, so that their images will show different respective views of the environment.

This fusion of data can be used to perform fever screening 364. Because the thermal information indicates the temperature of an object, a person's body temperature can be accurately determined. For people with a higher than normal body temperature, fever screening 364 may indicate that the person has a fever.

The face recognition 358 and fever screening 364 may be used in tandem to perform gate control 366, where access to a controlled area is determined according to a set of security policies. For example, access may be limited to people whose faces match the one of the registered faces 359. Access may further be barred to those individuals who show signs of a fever, for example to lessen the spread of disease. Responsive to these security policies, gate control 366 may operate the gate 368 to allow or deny access.

Figure 4:
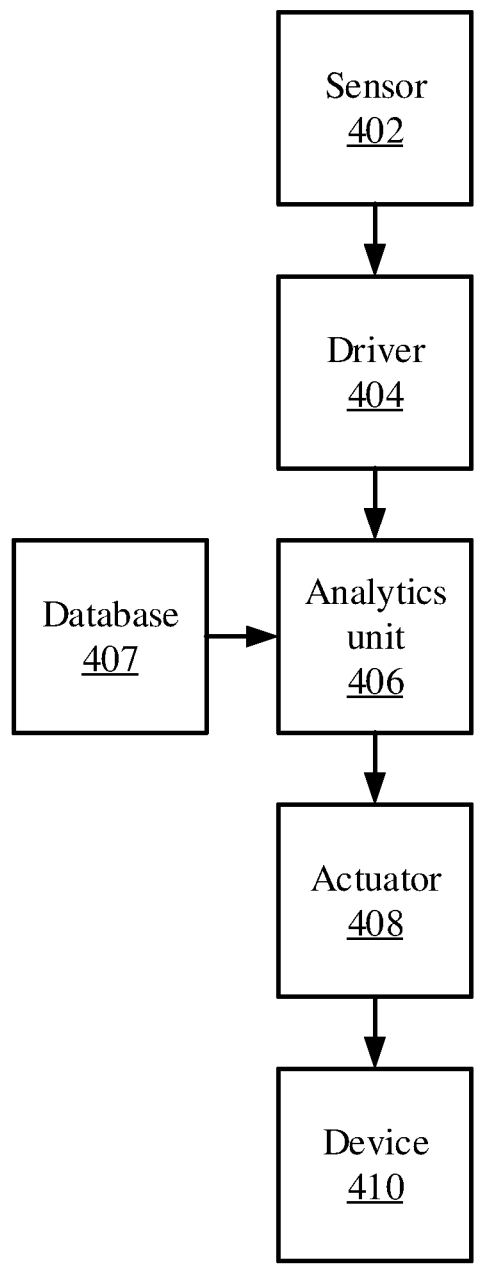
FIG. 4 is a block diagram of a data stream representation of a distributed computing application, in accordance with an embodiment of the present invention.

Referring now to FIG. 4, a representation of a distributed application is shown, which may be configured to process a data stream. A data stream may be a flow of homogeneous discrete messages. Some streams have only data that is produced by sensors 402, while others may include insights gained by analyzing and fusing data from the sensors 402. A given data stream may include multiple sensors 402 that each generate respective streams.

A sensor 402 is a device that produces raw data. Examples of sensors include cameras, location sensors (e.g., global positioning satellite sensors), environmental sensors such as temperature and pressure sensors, light detection and ranging (LIDAR) sensors, and radar sensors. Applications process and analyze raw data from sensors 402 to generate insights. Sensors 402 may have wired or wireless networking capability, or they may be physically attached to a computing device through an interface. Sensors 402 may be the beginning of a data stream and so represent the first stage of a distributed application. In the examples of FIGS. 3A and 3B, the camera 302, 352, and 354 may each represent a sensor 402.

A driver 404 may generate a data stream from a sensor's output. The driver 404 may perform any appropriate type of encoding or processing needed to generate the data stream, for example as video intake 304 may take the respective still images generated by the camera driver 302 and may encode them as a video bitstream.

Analytics unit 406 processes the data stream and/or generates an augmented data stream. One or more analytics units 406 may be used to perform different functions. An analytics unit may fuse multiple streams, for example accepting inputs from multiple sensors 402 and generating an output that is based on the multiple inputs, as shown in FIG. 3B.

For example, analytics unit 406 may include person detection 356 and face recognition 358. The analytics unit 406 subscribes to the data streams of the visual camera 352 and the thermal camera 354, processes the streams, and generates an output augmented stream that has, for example, indications about recognized faces and temperature information. The augmented stream may be used as inputs to other analytics units 406 or to actuators 408, which can control a device using the information in the input streams. In some cases, each individual function may be performed by a separate analytics unit 406. Distinct analytics units 406 may subscribe to a same input stream, making it a simple matter to reuse a stream.

In some cases, a database 407 may be used by the analytics unit 406 to help maintain a state of the application. For example, the biometrics manager 312 of the above example may include such a database to track biometric information of the various users.

In this example, the alerts manager 310 may perform the function of an actuator 408, generating instructions that may be used by a device 410. Such a device 410 may be physical or virtual and may be controlled using insights derived by the data analysis. Examples of devices 410 include entry/exit gates, displays, light arrays, and graphical user interfaces. Following the example above, system security 312 may represent such a device 410.

The device(s) 410 may have networking capabilities or may be connected directly to computing devices. The device (s) 410 may be the ending point of a particular distributed application. Not all applications will necessarily have a corresponding device 410. Also, a given device 410 may represent a sensor 402 and a device 410 if it generates data and can be controlled. For example, a camera 302 may produce a video stream, but may also allow remote management to configure camera parameters.

When programming such an application, the developer may provide logic for generating a stream from a sensor 402, for example using a driver 404, analyzing a stream or fusing multiple streams using an analytics unit 406, and/or controlling a device 410 using an actuator 408. This logic may be provided in the form of scripts that are interpreted by the abstraction engine 201 at run-time.

When creating a distributed application, a programmer may use an application programming interface (API) to handle configuration, receiving data, and publishing data. APIs may be implemented using the idiom of a given programming language and may be simple and lightweight. Some exemplary APIs include:

get-configuration: To receive the configuration provided at the rime of registration of a particular sensor or stream.

next: To receive the first available message from any of the input streams. This function returns the message and the name of the stream which produced the message. When there are multiple input streams, the stream's name can be used to identify the source of the input message. Drivers may not be able to use this function as they do not have an input stream.

emit: To publish a message in the output stream. All messages from a particular driver or analytics unit may go into the same output stream.

A "datax" module may be implemented in PYTHON® with a "DataX" class, having the following methods:

get-configuration: Returns a dict that has the content of the configuration file provided by the developer. If no configuration file is provided when registering the sensor or the stream, an empty dict may be returned.

next: Returns a tuple that has the name of the stream (str) and the message as a dict, where the keys are str.

emit(message): Message may be of type dict and the keys of the dict may be str, while the values can be any plain PYTHON® object.

The DataX class may be used from applications written in different programming languages. For example, in GO®, the opaque DataX struct may be instantiated and its methods may be used. In C++, a static DataX library can linked with the application to use its functions.

A standalone utility may be used during application development and deployment. A developer may interact with a client machine using the utility to deploy a distributed application. Some functions that may be implemented include package and deploy drivers, analytics units, and actuators; register sensors, streams, and gadgets, including details like name, configuration, connections, resource requirements, etc.; publish a stream for unmanaged sensors; receive an existing stream; retrieve logs for components; list existing components; remove existing components; and execute a function locally on a client machine.

This framework can provide an abstraction that simplifies application development and that makes distributed stream processing applications easier to write. Data scientists, who may not be familiar with the details of the underlying container orchestration engine 210, are able to use these abstractions to create a distributed application.

The abstractions may be implemented on top of a underlying container orchestration engine 210 in multiple ways. A first option is to use the underlying container orchestration engine's stock API server, where resources like Pods, StatefulSets, and ReplicaSets may be used to describe the application's desired state. The underlying container orchestration engine 210 handles deployment of the application and ensures that the current state matches the developer's declarative description of the desired state. However, the underlying container orchestration engine 210 may not understand the workload that is running when the first option is used. Another option is to extend the API server of the underlying container orchestration engine 210 (e.g., with abstraction engine 201) to add new functionality using operators, which may provide encapsulation of domain-specific knowledge of running a specific stream processing application. The container system API may be extended by defining operators, allowing the abstraction engine to take advantage of the underlying container orchestration engine's tools.

Custom resources may be defined as extensions of the container system's API. A resource may be an endpoint in the API that stores a collection of API objects of a certain kind. For example, the built-in Pods resource may include a collection of Pod objects. Once a custom resource is installed, its objects can be accessed through the underlying container orchestration engine 210 in the same manner as built-in resources. Components like drivers, analytics units, actuators, sensors, gadgets, streams, and databases may thereby be implemented in the underlying container orchestration engine 210 as custom resources.

A new operator may be defined as a software extension to the container orchestration engine 210 that makes use of custom resources to manage distributed applications and their components. The operator pattern provides the logic for monitoring and maintaining resources that it defines, which means that the operator can take actions based on the resource's state.

For example, the operator may take actions needed to ensure that the distributed application is in a coherent state at all times. It also protects the system from users' actions that might bring the system into an unrecoverable incoherent state. For example, uninstalling a driver while a sensor is being used can bring the system into an incoherent state, but the operator can detect this and prevent it.

To register a driver, an analytics unit, or an actuator, a user may provide the name, a script or image that includes the business logic, and optionally a configuration schema. When the user provides just a script, the operator may automatically create an image for executing the script. When the user requests an upgrade of drivers, analytics units, and/or actuators, the operator may automatically cascade the upgrade to running instances. The operator may ensure the coherency of the upgrade by enforcing that new configuration schemas are compatible with the schemas of the running instances. When performing an upgrade, the user may optionally provide a script to convert the configuration schemas, in which case the operator will accept the upgrade only if the script can be executed successfully for all running instances. If a user requests the deletion of a driver, analytics unit, or actuator, then the operator may check if the entity is currently in use and refuse the operation if there is already a running instance for that entity.

When registering a sensor, the operator ensures that the associated driver is installed and that the driver configuration schema provided by the user is compatible with the configuration schema expected by the installed driver. The operator may also maintain the driver's running instance on appropriate computing resources as long as the sensor is registered. For example, if a sensor is physically attached to a computing node through a USB interface, then the operator may maintain a running instance on the same computing node. A registered sensor may generate an output stream that has the same name as the sensor.

A user may request to create augmented streams by providing an analytics unit that generates the stream, the input streams, and a configuration for the analytics unit. The operator checks that the analytics unit is available, that the configuration is compatible, and that the input streams are registered. Unless the user requests a fixed number of instances, the operator may then automatically scale the number of instances of the analytics unit. The operator may perform similar operations when the user registers a new gadget. Before deleting any sensors or streams, the operator may ensure that they are not inputs that are used to produce other streams.

Communication between microservices may be handled using, e.g., a message bus or distributed queue or by a communications protocol such as HTTP. However, a scalable message queue, like Neural Autonomic Transport System (NATS), can automatically set up communications mechanisms among entities like drivers, analytics units, and actuators. The operator manages the deployment and configuration of NATS, which then uses authentication and authorization so that only services associated with the abstraction engine 201 may connect to the NATS server, for example to subscribe and publish only on the defined and registered streams.

The operator that implements the abstraction engine 201 may further use a containerized application, called a sidecar, that the operator may run alongside each instance of a user-provided driver, analytics unit, or actuator. The sidecar may automatically manage data communications with a message bus, including connection, subscription, and publishing messages. The sidecar may further monitor the health of the user's application, for example exposing metrics such as systems resource utilization and the number of messages received, dropped, and published. The operator and the underlying container orchestration engine 210 may use those metrics to ensure that all the components are working correctly, and also to drive the auto-scaling process.

Figure 5:
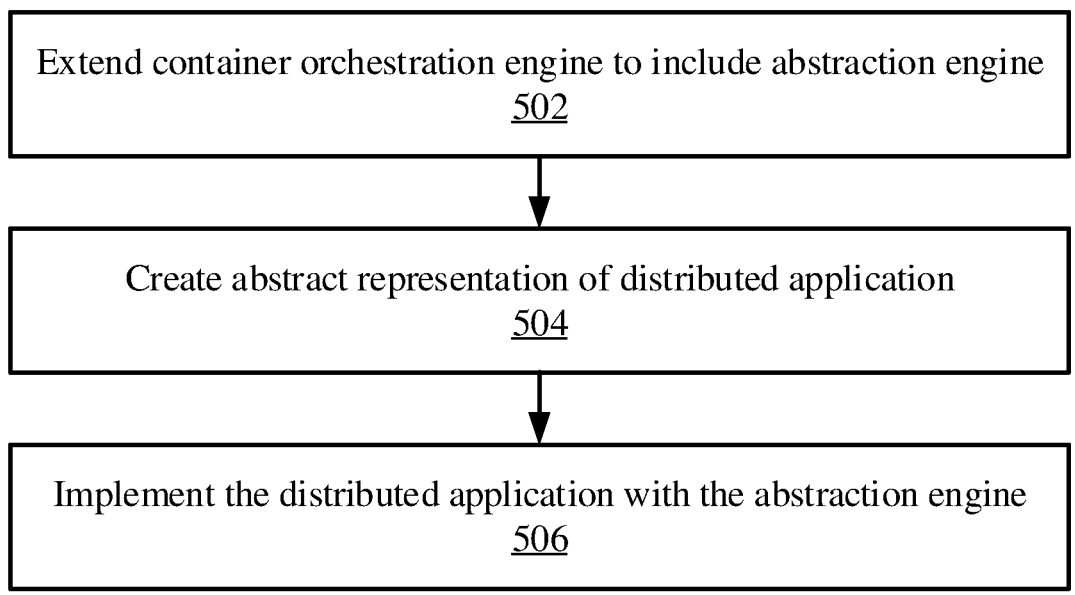
FIG. 5 is a block/flow diagram of a method of executing a distributed computing application using an extension to a container orchestration engine, in accordance with an embodiment of the present invention.

Referring now to FIG. 5, a method for creating and deploying a distributed application is shown. Block 502 extends the container orchestration engine 210 to include the abstraction engine 201 as described above. Block 502 may use operators to add new functionality to the container orchestration engine 210, for example to define objects that can be used to represent a distributed application so that the container orchestration engine 210 can interact with those objects. Thus, a pre-existing container orchestration engine 210 can be extended to handle components like drivers, analytics units, sensors, devices, streams, and databases. In some examples, extending the container orchestration engine 210 may include using operators within a KUBERNETES® system.

In block 504, a software developer creates a representation of the distributed application, for example defining a data stream that begins at a sensor 402 and that ends at a device 410, with any appropriate drivers 404, analytics units 406, and actuators 408 in between. The abstract representation may include any appropriate configuration information for physical components, including designating the components to be used and how those components are to be initialized and shut down. The analytics units 406 may include instructions for any appropriate type of processing, accepting information of one type and outputting augmented information. The abstract representation may identify relationships between each component of the application, for example specifying that the output of a given component forms the input of a next component.

The abstract representation may be stored in a format that can be read by the abstraction engine 201, for example with a set of instructions for the extended API of the container orchestration engine 210. The abstract representation may then be distributed to the processing nodes 106.

Block 506 implements the distributed application using the abstraction engine 201 and the container orchestration engine 210. Because the abstraction engine 201 adds functionality to the API of the container orchestration engine 210, the container orchestration engine 210 can treat the objects of the abstract representation as native elements, instantiating whatever containers 208 are called for to implement specified microservices.

Figure 6:
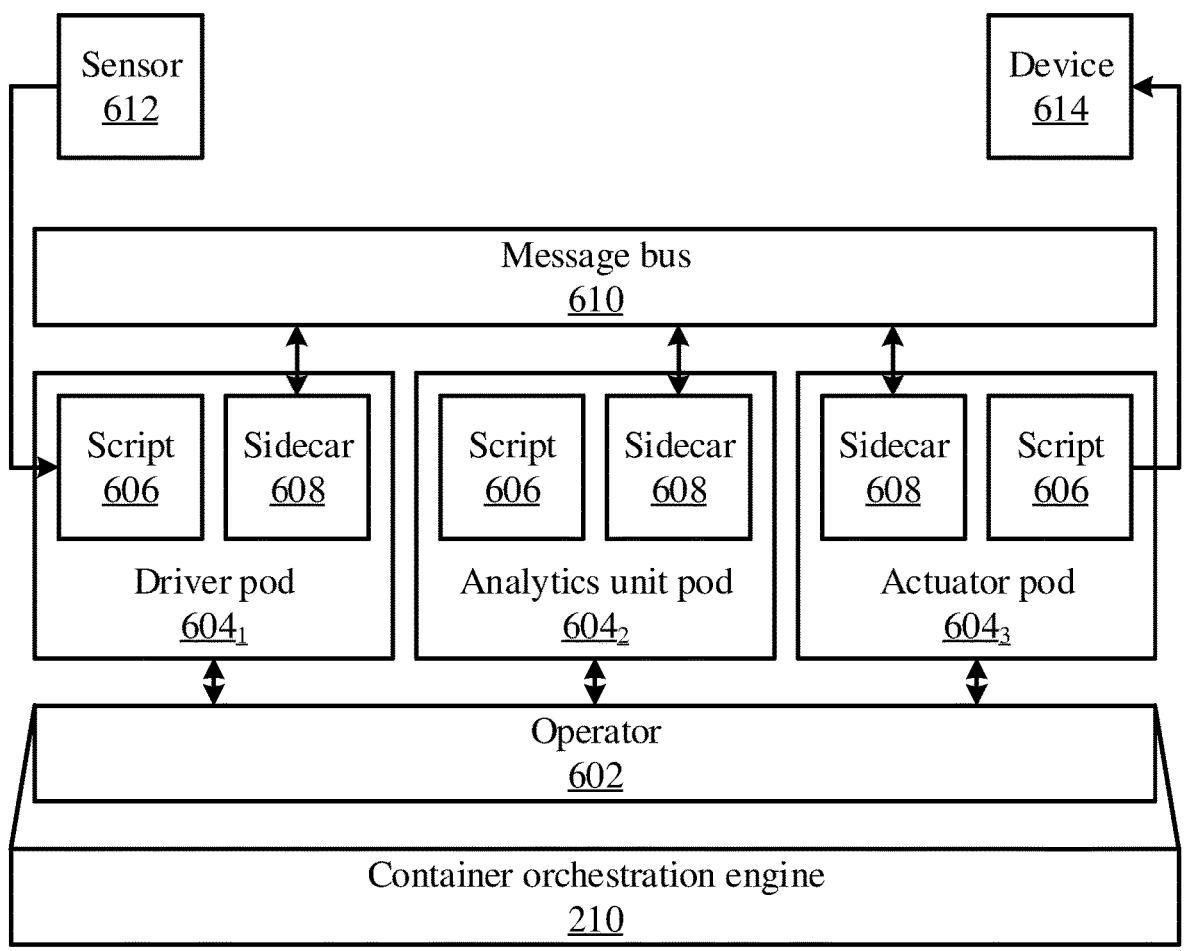
FIG. 6 is a block diagram of a hardware processing system that executes a distributed computing application, in accordance with an embodiment of the present invention.

Referring now to FIG. 6, additional detail on an implementation of a distributed application is shown. The container orchestration engine 210 includes an operator 602 that extends the default functionality of the engine 210. By interfacing with the operator 602, pods 604 may be instantiated (e.g., as one or more containers) to perform the roles of drivers $604_1$, analytics units $604_2$, and actuators $604_3$. Each pod 604 may include a script 606, which may interact with other elements of a system, and a sidecar 608, which may communicate with other pods 604.

Thus, information from a sensor 612 may be processed by the script 606 of a diver pod $604_1$ to perform processing on the input information. The sidecar 608 of the driver pod $604_1$ may communicate with the sidecar 608 of an analytics unit pod $604_2$ via a message bus 610 (or any other appropriate communications mechanism). The analytics unit pod $604_2$ may take the information from the driver pod $604_1$ as input and may generate an augmented data stream, which may be sent to actuator pod $604_3$ via the message bus 610. The script 606 of the actuator pod $604_3$ may then make a determination regarding an action to take, based on the augmented data stream, and may issue commands to a device 614.

Figure 7:
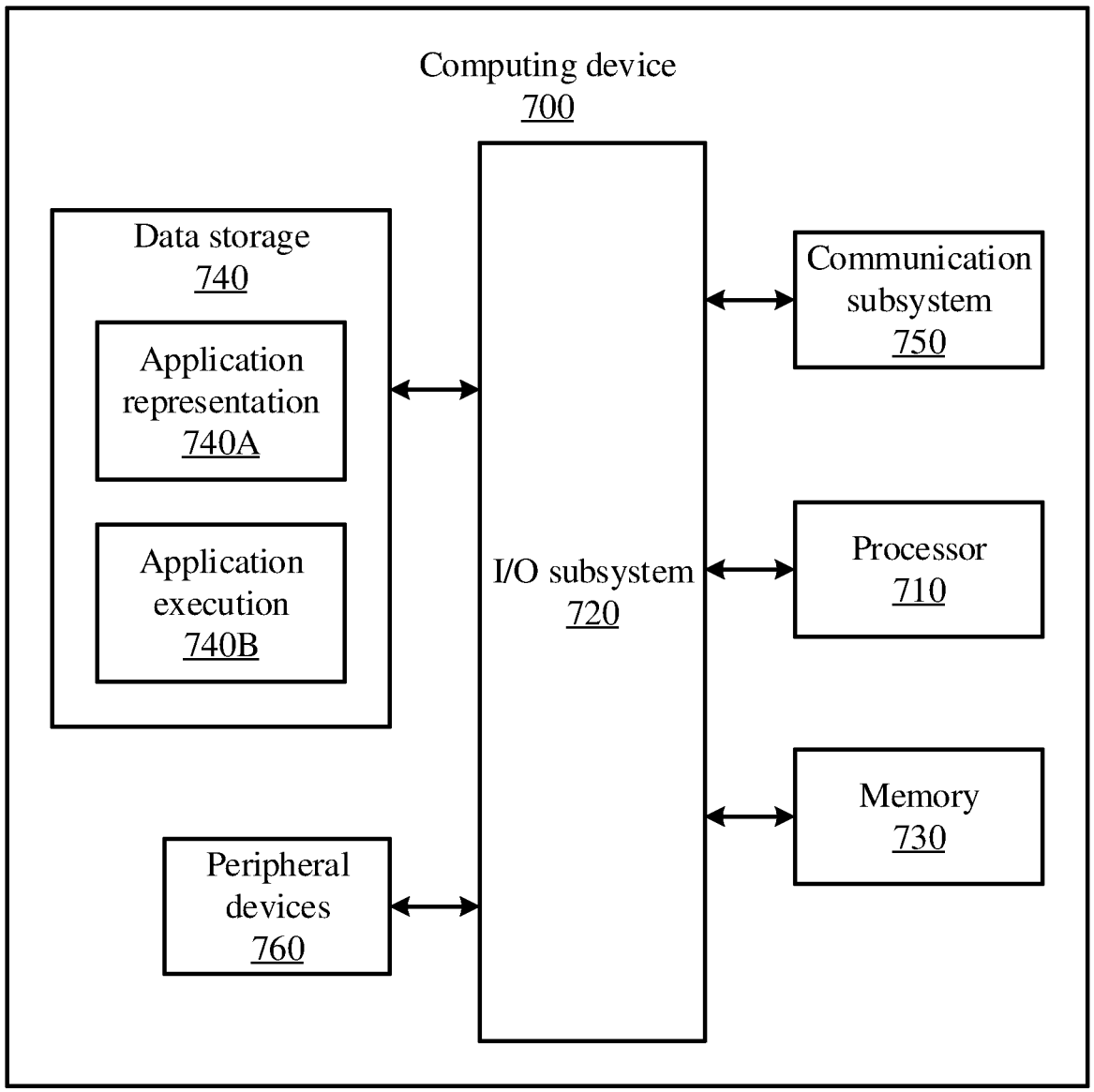
FIG. 7 is a block diagram of an extended container orchestration engine that executes a distributed computing application, in accordance with an embodiment of the present invention.

Referring now to FIG. 7, an exemplary computing device 700 is shown, in accordance with an embodiment of the present invention. The computing device 700 is configured to perform application abstraction and execution.

The computing device 700 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 700 may be embodied as a one or more compute sleds, memory sleds, or other racks, sleds, computing chassis, or other components of a physically disaggregated computing device.

As shown in FIG. 7, the computing device 700 illustratively includes the processor 710, an input/output subsystem 720, a memory 730, a data storage device 740, and a communication subsystem 750, and/or other components and devices commonly found in a server or similar computing device. The computing device 700 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 730, or portions thereof, may be incorporated in the processor 710 in some embodiments.

The processor 710 may be embodied as any type of processor capable of performing the functions described herein. The processor 710 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 730 may be embodied as any type of volatile or non-volatile memory or data storage capable of performing the functions described herein. In operation, the memory 730 may store various data and software used during operation of the computing device 700, such as operating systems, applications, programs, libraries, and drivers. The memory 730 is communicatively coupled to the processor 710 via the I/O subsystem 720, which may be embodied as circuitry and/or components to facilitate input/output operations with the processor 710, the memory 730, and other components of the computing device 700. For example, the I/O subsystem 720 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 720 may form a portion of a system-on-a-chip (SOC) and be incorporated, along with the processor 710, the memory 730, and other components of the computing device 700, on a single integrated circuit chip.

The data storage device 740 may be embodied as any type of device or devices configured for short-term or long-term storage of data such as, for example, memory devices and circuits, memory cards, hard disk drives, solid state drives, or other data storage devices. The data storage device 740 can store program code 740A for generating an abstract representation of a distributed application and program code 740B for executing the abstract representation, including implementing the abstraction engine 201 with a container orchestration engine 210. The communication subsystem 750 of the computing device 700 may be embodied as any network interface controller or other communication circuit, device, or collection thereof, capable of enabling communications between the computing device 700 and other remote devices over a network. The communication subsystem 750 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 700 may also include one or more peripheral devices 760. The peripheral devices 760 may include any number of additional input/output devices, interface devices, and/or other peripheral devices. For example, in some embodiments, the peripheral devices 760 may include a display, touch screen, graphics circuitry, keyboard, mouse, speaker system, microphone, network interface, and/or other input/output devices, interface devices, and/or peripheral devices.

Of course, the computing device 700 may also include other elements (not shown), as readily contemplated by one of skill in the art, as well as omit certain elements. For example, various other sensors, input devices, and/or output devices can be included in computing device 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 700 are readily contemplated by one of ordinary skill in the art given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for executing an application, comprising:
    extending a container orchestration system application programming interface (API) to handle objects that specify components of the application; and
    executing an application representation using the extended container orchestration system API, including instantiation of one or more services that define a data stream path from a sensor to a device, the data stream path including the sensor, a driver that defines how information from the sensor is handled, the device, an actuator that defines how inputs are applied to the device, wherein an analytics unit performs data processing on an input and fuses data stream paths from multiple sensors to generate an augmented output by identifying temporal and spatial correspondences between the data stream paths.

2. The computer-implemented method of claim 1, wherein the container orchestration system uses a container management system that handles execution of the application representation on one or more physical processing nodes.

3. The computer-implemented method of claim 2, wherein extending the container orchestration system API includes adding one or more functions to the container orchestration system API using an operator.

4. The computer-implemented method of claim 3, wherein executing the application representation includes executing functions of the extended container orchestration system API that are specified by the application representation.

5. The computer-implemented method of claim 1, wherein the container orchestration system instantiates one or more microservices as pods that include a script to perform processing on a data stream and a sidecar that communicates with other pods in the application.

6. The computer-implemented method of claim 1, wherein executing the application representation includes instantiating a database that maintains state information for the data analytics unit.

7. The computer-implemented method of claim 1, wherein instantiation of the one or more services includes instantiating microservices as containers in one or more hardware processing nodes and establishing communications paths between the microservices along the data stream path.

8. The computer-implemented method of claim 1, wherein the data stream path includes one or more reusable data streams that can be accessed by a service of a second application.

9. The method of claim 1, wherein the data stream paths include a video camera and an infrared camera as respective sensors.

10. The method of claim 9, wherein identifying the spatial correspondences includes identifying regions of thermal images that correspond to regions of visual images where a person is detected.

11. The method of claim 10, wherein the augmented output includes a determination that a person's body temperature is higher than normal, indicating a fever.

12. A system for executing an application, comprising:
    a hardware processor;
    a memory that stores a computer program, which, when executed by the hardware processor, causes the hardware processor to:
        extend a container orchestration system application programming interface (API) to handle objects that specify components of the application; and
        execute an application representation using the extended container orchestration system API, including instantiation of one or more services that define a data stream path from a sensor to a device, the data stream path including the sensor, a driver that defines how information from the sensor is handled, the device, an actuator that defines how inputs are applied to the device, wherein an analytics unit performs data processing on an input and fuses inputs from data stream paths to generate an augmented output by identifying temporal and spatial correspondences between the data stream paths.

13. The system of claim 12, wherein the container orchestration system uses a container management system that handles execution of the application representation on one or more physical processing nodes.

14. The system of claim 13, wherein the hardware processor is further configured to add one or more functions to the container orchestration system API using an operator.

15. The system of claim 14, wherein the hardware processor is further configured to execute functions of the extended container orchestration system API that are specified by the application representation.

16. The system of claim 12, wherein the container orchestration system instantiates one or more microservices as pods that include a script to perform processing on a data stream and a sidecar that communicates with other pods in the application.

17. The system of claim 12, wherein the hardware processor is further configured to instantiate a database that maintains state information for the data analytics unit.

* * * * *